(12) United States Patent
Waful et al.

(10) Patent No.: US 12,444,143 B1
(45) Date of Patent: Oct. 14, 2025

(54) AUGMENTED REALITY-BASED VEHICLE GUIDANCE FOR IMPROVED DRIVING SAFETY

(71) Applicant: UIPCO, LLC, San Antonio, TX (US)

(72) Inventors: Christopher James Waful, San Antonio, TX (US); Gerald Richard Halbeisen, Cibolo, TX (US); Christopher Lee Doughton, San Antonio, TX (US)

(73) Assignee: United Services Automobile Association, San Antonio, TX (US)

(*) Notice: Subject to any disclaimer, the term of this patent is extended or adjusted under 35 U.S.C. 154(b) by 232 days.

(21) Appl. No.: 18/160,552

(22) Filed: Jan. 27, 2023

Related U.S. Application Data

(60) Provisional application No. 63/304,353, filed on Jan. 28, 2022.

(51) Int. Cl.
| | |
|---|---|
| *G06T 19/00* | (2011.01) |
| *G01S 19/01* | (2010.01) |
| *G06Q 10/20* | (2023.01) |
| *G06Q 30/0207* | (2023.01) |
| *G06T 11/00* | (2006.01) |
| *G06V 10/764* | (2022.01) |
| *G06V 20/56* | (2022.01) |

(52) U.S. Cl.
CPC ............ *G06T 19/006* (2013.01); *G01S 19/01* (2013.01); *G06Q 10/20* (2013.01); *G06Q 30/0207* (2013.01); *G06T 11/00* (2013.01); *G06V 10/764* (2022.01); *G06V 20/56* (2022.01)

(58) Field of Classification Search
CPC .... G06T 19/006; G06T 11/00; G01C 21/3679
See application file for complete search history.

(56) References Cited

U.S. PATENT DOCUMENTS

| | | | | |
|---|---|---|---|---|
| 7,848,765 | B2* | 12/2010 | Phillips | G08B 21/0272 |
| | | | | 455/414.1 |
| 10,495,476 | B1* | 12/2019 | Yu | G01C 21/3647 |
| 11,397,719 | B1* | 7/2022 | Khoyilar | H04L 51/216 |
| 2010/0253594 | A1* | 10/2010 | Szczerba | G08G 1/167 |
| | | | | 345/7 |
| 2014/0362195 | A1* | 12/2014 | Ng-Thow-Hing | G06V 40/20 |
| | | | | 348/51 |
| 2017/0200048 | A1* | 7/2017 | Yamada | G01C 21/3896 |
| 2020/0107155 | A1* | 4/2020 | Williams | G16H 40/67 |
| 2022/0381580 | A1* | 12/2022 | Shah | G06F 16/29 |

\* cited by examiner

*Primary Examiner* — William A Beutel
*Assistant Examiner* — Chris Alejandro Puntier
(74) *Attorney, Agent, or Firm* — Plumsea Law Group, LLC

(57) ABSTRACT

A method and system of intelligently managing information being presented to a driver in a vehicle via a mobile computing device is provided. The method includes obtaining sensor data from the mobile computing device to determine whether unsafe driving behavior is occurring, and causing alerts to be presented via the mobile computing device. In other examples, the system can detect whether billboards are visible ahead of the vehicle and overlay alternate projections on the billboard, effectively replacing the billboard content as it is displayed on the mobile computing device.

19 Claims, 12 Drawing Sheets

AUGMENTED REALITY-BASED VEHICLE GUIDANCE FOR IMPROVED DRIVING SAFETY

CROSS-REFERENCE TO RELATED APPLICATION

This application claims the benefit of U.S. Provisional Patent Application Ser. No. 63/304,353 filed on Jan. 28, 2022 and titled "Augmented Reality-Based Vehicle Guidance for Improved Driving Safety", the disclosure of which is incorporated by reference in its entirety.

TECHNICAL FIELD

The present disclosure generally relates to driving safety, and specifically to a method and system for presenting information via mobile devices to drivers in response to their vehicle's current path.

BACKGROUND

Defensive driving skills help drivers reduce the risk of collisions by anticipating dangerous situations that may occur while driving, even when the driver is operating the vehicle in a technically sound manner. One aspect of defensive driving may include ensuring that the driver has adequate warning of upcoming obstacles on the road. In particular, obstacles that are dynamic and changing position can present difficulties to a driver's ability to respond in a thoughtful manner. Such obstacles can be non-vehicular, such as animals, children, or other unexpected obstacles. Providing information about these external road conditions to a driver can significantly reduce the likelihood of accidents and damage to persons and property. Currently, vehicle alert systems offer basic information about conditions directly associated with the vehicle's current location. Conventional alerts fail to convey warnings about dynamic obstacles that may be present at a location still ahead of the driver as they travel along a particular route.

There is a need in the art for a system and method that addresses the shortcomings discussed above.

SUMMARY

In one aspect, a computer-implemented method of intelligently managing the presentation of information to a driver of a vehicle is disclosed. In a first step, the method includes receiving, at an application of a mobile computing device, first location data of the vehicle from a GPS device of the mobile computing device as falling in a first zone, and a second step of receiving, at the application, first image data of an ongoing first roadway scene through a forward windshield of the vehicle, the first image data captured by a camera associated with the mobile computing device. In a third step, the method includes classifying, at the application, a first object in the first roadway scene as a first billboard displaying a first original content, and a fourth step includes determining, via the application and with reference to a merchant database, that a first merchant is located within the first zone. A fifth step includes presenting, via the application and on a display of the mobile computing device, in response to determining the first merchant is in the first zone, an augmented reality-based first projection overlaid on the first original content, the first projection including a first replacement content that is related to the first merchant.

In another aspect, a computer-implemented method of intelligently presenting driving guidance to a driver of a first vehicle is provided. The method includes a first step of receiving, at an application of a mobile computing device, first image data of an ongoing first roadway scene through a forward windshield of the first vehicle, the first image data captured by a camera associated with the mobile computing device, a second step of classifying, at the application, a first object in the first roadway scene as one of a vehicle and lane markers, a third step of determining, at the application and based at least on a detected movement of the first object, that an unsafe driving behavior has occurred, and a fourth step of presenting, in response to determining an unsafe driving behavior has occurred, a first message alerting the driver of the unsafe driving behavior.

In another aspect, a system for intelligently managing the presentation of information to a driver of a vehicle includes a processor and machine-readable media including instructions which, when executed by the processor, cause the processor to receive, at the application, first location data of the vehicle from a GPS device of the mobile computing device as corresponding to a first zone, and also to receive, at an application of a mobile computing device, first image data of an ongoing first roadway scene through a forward windshield of the vehicle, the first image data captured by a camera associated with the mobile computing device. The instructions further cause the processor to classify, at the application, a first object in the first roadway scene as a first billboard displaying a first original content, and to determine, via the application and with reference to a merchant database, that a first merchant is located within the first zone. In addition, the instructions cause the processor to present, via the application and on a display of the mobile computing device, in response to determining the first merchant is in the first zone, an augmented reality-based first projection overlaid on the first original content, the first projection including a first replacement content that is related to the first merchant.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The embodiments provide a method and system for improving driver safety. Specifically, the method and system enable intelligent augmented-reality (AR)-based alerts to be presented to a driver of a vehicle based on data obtained via sensors associated with a mobile computing device located in the vehicle. The data will include information about the vehicle's current location, guidance regarding the roadway ahead, merchants in the local area, as well as external road conditions that are detected on the road as the vehicle continues forward on its journey.

Figure 1:
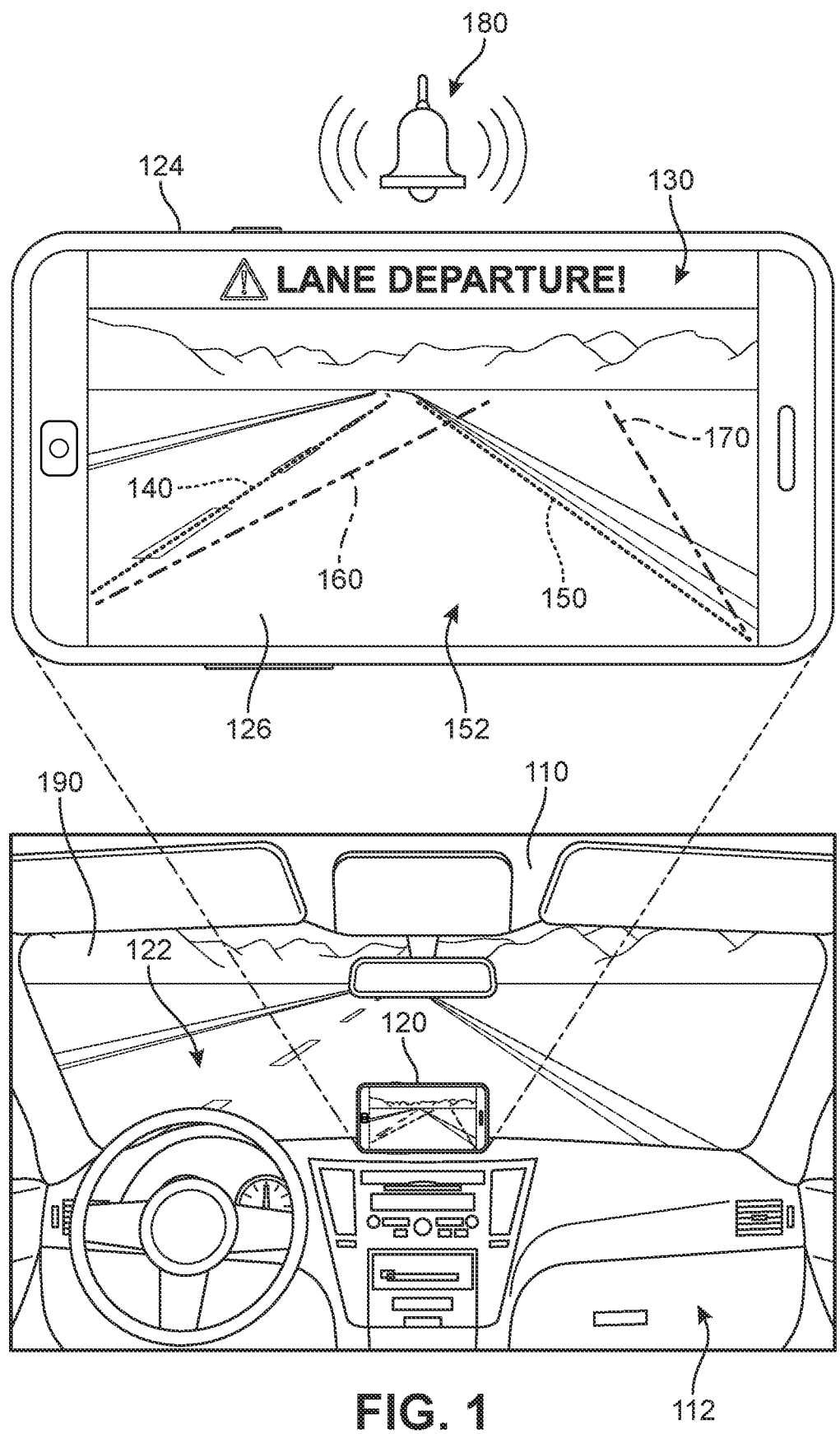
FIG. 1 is an example of an interior view of a motor vehicle in which a mobile computing device presents augmented reality (AR)-based indicators of the roadway ahead, according to an embodiment.

For purposes of clarity, an overview of one embodiment of the proposed systems and methods is illustrated with reference to FIG. 1. In different embodiments, a driver may mount their mobile phone, shown here as a first device 120, on a dashboard or other interior region 112 of a vehicle 110. The first device 120 should be positioned such that a roadway 122 viewed through a forward windshield 190 is in a field of view of a camera of the first device 120. In FIG. 1, a magnified view 124 of the first device 120 is also shown to illustrate some of the features of an application ("app") 126 running on the first device 120 as the vehicle is traveling forward on the roadway 122.

In different embodiments, the first device 120 may be configured to communicate with one or more remote systems over a network (not shown in FIG. 1). The network could comprise any wide area network, local area network or other suitable network. In some cases, network may be the Internet. The first device 120 may communicate, for example, with one or more external database systems. An external database system can include a server (including processors and memory) and a database, and the external database system may store various kinds of information, including, but not limited to: navigation information, geo-spatial information, road conditions (for example, real-time traffic patterns), weather information (including, for example, rain, snow, ice and/or flooding forecasts), local merchant information, user account information, as well as other kinds of information. It may be appreciated that first device 120 may both send and receive information to and from these remote databases. Moreover, it may also be appreciated that in other embodiments, one or more of these databases (or parts of the databases) could be locally disposed within the first device 120.

In magnified view 124, the app 126 can be seen to present a real-time view 152 of the roadway 122 as captured by a camera installed in first device 120. In different embodiments, the app 126 includes provisions for presenting alerts and/or guidance to a user in response to data obtained via one or more sensors associated with the first device 120. In different embodiments, a model implemented by the app 126 is configured to determine, based on image data captured by the camera, as well as other sensor data as discussed below, what a vehicle's likely trajectory is as well as whether that trajectory is risky enough to warrant an alert. In the example of FIG. 1, the app 126 has identified road markers such as a first lane marker 140 and a second lane marker 150 that demarcate the vehicle's current lane. In addition, in different embodiments, the app 126 is configured to extrapolate the likely trajectory of the vehicle 110 based on data obtained by the sensors of the first device 120, and overlay one or more AR indicators on the real-time view 152 of roadway 122. More specifically in this case the app 126 has included a first trajectory line 160 and a second trajectory line 170 that together show the likely heading of vehicle 110. In FIG. 1, it can be seen that the heading would move the vehicle 110 out of its current lane and off of the roadway 122 itself. In response to this triggering event, the app 126 presents a first visual alert 130 ("Lane Departure") on the display of the first device 120, and also presents a first audio alert 180 from a speaker of the first device 120.

Thus, as will be described in greater detail below, the proposed embodiments can determine if a trajectory is likely to result in dangerous driving conditions and present alerts, including augmented reality (AR) overlays, at appropriate times to the driver as the vehicle approaches these projected situations. The system can also advise the driver of alternate driving behavior(s) that would reduce the likelihood of a dangerous outcome between the vehicle and the potential obstacle or other risk. In some embodiments, an image recognition system can be configured to use sensed information to identify objects at a distance that are traveling near the vehicle 110, such as debris, pedestrians, and other vehicles. The app 126 can also receive information about local driving rules and conditions based on signage and access to a knowledge database about the area.

In different embodiments, the first device 120 includes one or more processors and memory. Memory may comprise a non-transitory computer readable medium. Instructions stored within memory may be executed by the one or more processors. First device 120 may also include one or more communication components. In this case, the communication module is illustrated as a wireless connection; however, wired connections may also be used. For example, the communication module may include a wired serial bus such as a universal serial bus or a parallel bus, among other connections. The communication module may also include a wireless connection using Bluetooth® radio technology, Wi-Fi, communication protocols described in IEEE 802.11 (including any IEEE 802.11 revisions), Cellular technology (such as GSM, CDMA, UMTS, EV-DO, WiMAX, or LTE), or Zigbee® technology, among other possibilities First device 120 may also include a navigation system. In some cases, navigation system includes a GPS receiver that can receive GPS information or other receivers capable of receiving global or local positioning information. In other cases, navigation system can include other receivers capable of receiving global or local positioning information. Additionally, navigation system may comprise maps and/or information from other kinds of geographic information systems (GIS) that can be used to generate and/or monitor navigation routes for a driver. Furthermore, the first device 120 may also include one or more sensors (see FIG. 2). The first device 120 may be configured to receive and analyze data from various sensors associated with a sensor unit in the first device 120 or data that is communicated from external components or devices to first device 120. In different examples, the sensor unit includes a variety of sensors. The sensors can include one or more of an image sensor such as a camera, as well as a light sensor, a temperature sensor, an infrared sensor, a microphone, motion sensor, an air or chemical sensor, among others. In some cases, the first device 120 may also include a navigation system equipped with a GPS receiver that can receive GPS information or other receivers capable of receiving global or local positioning information.

Figure 2:
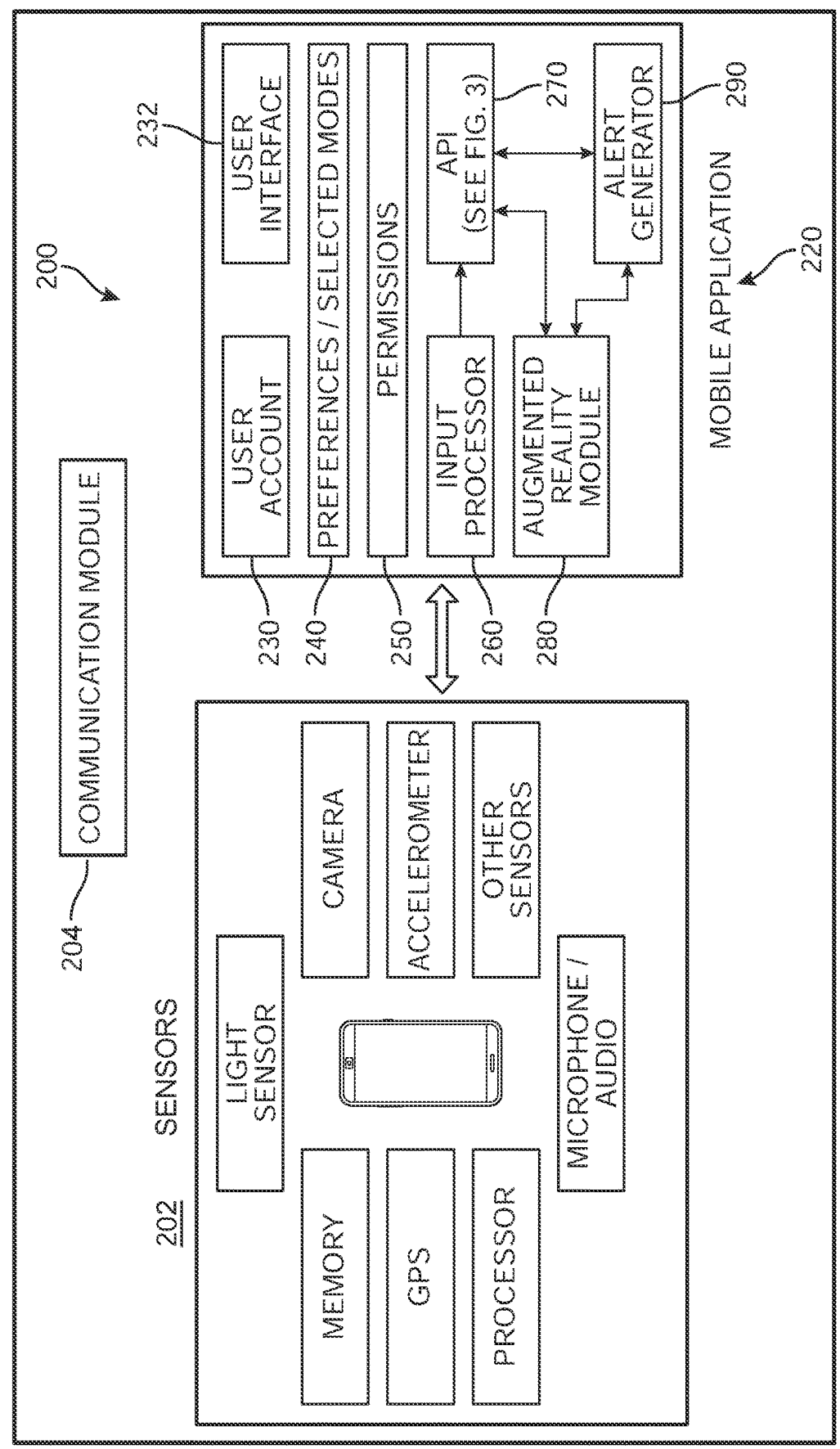
FIG. 2 is a schematic diagram of a vehicle information management system for drivers, according to an embodiment.

Referring now to FIG. 2, a schematic diagram representing the architecture of one embodiment of a driver guidance system ("system") 200 is illustrated. In FIG. 2, the system 200 includes a user device 210, such as a mobile computing device, which includes or has access to (over a network) to a mobile application ("mobile app") 220. Thus, mobile app 220 can reside entirely on the user device 210, be accessed over a network via a remote server, or include some components on mobile device 210 and others at the remote server. In different embodiments, such a network could include one or more Wide Area Networks (WANs), Wi-Fi networks, Bluetooth or other Personal Area Networks, cellular networks, as well as other kinds of networks.

In addition, user device 210 can include provisions for communicating with, and processing information from, a server as well as other devices. It may be appreciated that different devices could communicate using different networks and/or communication protocols. For purposes of this disclosure, a communication protocol refers broadly to any type of communication system that enables wireless communications to/from a mobile device. A communication module 204 of a user device 210 may include a wireless connection that implements or includes components providing one or more communication protocols such as Bluetooth® radio technology, communication protocols described in IEEE 802.11 (including any IEEE 802.11 revisions) such as Wi-Fi, as well as communication protocols that rely on cellular technology (such as GSM, CDMA, UMTS, EV-DO, WiMAX, or LTE), or Zigbee® technology, among other possibilities. In many cases, the communication module is a wireless connection; however, wired connections may also be used. For example, the communication module may include a wired serial bus such as a universal serial bus or a parallel bus, among other connections. A user device may further include one or more processors and memory. Memory may comprise a non-transitory computer readable medium. Instructions stored within memory may be executed by the one or more processors. In addition, each device may include a communication system such as a radio or other provisions for communicating using one or more communication methods. In particular, the communication system includes provisions for communicating with other nearby devices and/or a server over a network. For example, each communication system could include a Wi-Fi radio, a Bluetooth radio, and/or a cellular network radio.

In some embodiments, an end-user can interact with the proposed system, for example via the mobile app 220. In some embodiments, some or all components and features of the mobile app 220 can be downloaded to be accessible locally on the device. In other embodiments, some or all components and features can be accessed via a web-based service over a network. The mobile app 220 can offer a user settings and profile interface ("user interface") 232 for accessing and modifying settings and viewing application activity. The user interface may refer to an operating system user interface or the interface of one or more software applications that may run on the user device 210. In some embodiments, user account data 230 can be stored in the app or at the server, and include app-related user-specific information such as user preferences 240, such as but not limited to the user's selected trigger event preferences (i.e., what type of data or situation should cause the system to present an alert or other information), the user's desired alert preferences 226 (e.g., SMS messages, in-app messages, audio alerts, volume, visual alerts, frequency of alerts, etc.), user permissions 250 to identify which types of input (image, sound, speed, etc.) are allowed for collection by the mobile app 210, as well as an optional app activity history repository that can store and present to the user (via user interface 232) various data reflecting past app-based alerts and responses. In some embodiments, the mobile app 220 can be configured to connect to a server (for example, via a Wi-Fi or cellular connection) to add or modify information for the user account 230, for example in a cloud-hosted user account database 294. In other embodiments, such data can be stored locally. In other embodiments, the mobile app 220 can refer to a remote service accessed by the mobile device over a network.

As noted earlier, in different embodiments, the system is configured to detect various indications of a potential risk condition, determine whether these indications correspond to a triggering event with respect to the user's preferences, and perform an automated protective or defensive messaging operation in response to the triggering event. User device 210 can include or otherwise be in communication with one or more sensor devices ("sensors") 202. Some non-limiting examples of such sensors include, but are not limited to, image sensors, microphone or other audio sensors, capacitive sensors, motion sensors, heat sensors, location data, infrared (IR) sensors, time-of-flight (TOF) sensors, and/or ultrasonic sensors. In other words, there are a variety of sensors that may be configured to collect data that can be related to the detection of various triggering events, and as mobile devices become more advanced, additional types of sensor data may become available. As one example, the user device 210 can include ambient light sensors, which detect light in the environment. In addition, data from time-of-flight sensors can be included; these sensors emit a signal that reflects off a surface and measures the time it takes to return to the sensor. Time-of-flight sensors include multiple types of signals, such as lasers, IR, and ultrasound. Time-of-flight sensors use an array of light-sensing pixels to determine relative distances from the object, creating a range map. This allows for a complex and informative view of the environment. Data from passive IR detectors (PIR sensors) can also be collected, and used to detect motion of IR light-emitting sources and look for changes in the IR world that are detected. In addition, visual sensors, including thermal vision cameras, in conjunction with image processing and recognition techniques, can be used to detect common shapes such as various types of vehicles (e.g., trucks, semis, sedans, SUVs, station wagons, motorcycles, wagons, trailers, etc.), humans, animals, debris, potholes, lane markers, signage, traffic signals, etc.

Any of these or other types of sensors can collect sensor data for use by the mobile app 220, which can then apply specialized object detection software to determine whether the sensor data 272 includes a feature that is associated with a high likelihood of falling into one of the below listed categories. In some embodiments, as shown in FIG. 2, mobile app 220 can receive a range of sensor data from user device 210 (e.g., image data from a camera, light data from a light sensor, audio data from a microphone, motion data from an accelerometer, navigational data from a GPS, and other data captured by various sensors that may be included in or connected to the user device 210). One or more of these data types can be used to determine whether there is a potential risk condition or other relevant object near enough to the vehicle to represent a potential triggering event.

In some embodiments, sensor data received that indicate one or more of the following can serve as triggering events: (a) repeated fast acceleration or deceleration (if the car seems to be rapidly, and chronically, accelerating or decelerating), (b) zig-zagging, (c) drifting into the other lane, (d) slow response to signals (e.g., if a vehicle seems to take a while to respond to a green light or a stop sign), (e) driving too slowly (e.g., driving 10 mph or more under the speed limit), (f) blind spots (e.g., if the vehicle is positioned in what appears to be a truck's blind spot), (g) failure of other drivers to use signals when changing lanes, (h) speeding, (i) hazardous obstacles in the road, (j) road irregularities, or other erratic driving behavior. It should be appreciated that these events can be used to generate alerts directed toward the driver of the vehicle to encourage safer driving, as well as to warn the driver of other vehicles/aspects on the road ahead of the user that are driving unsafely.

In addition, in some embodiments, the system 200 is configured to incorporate computer vision and other machine learning techniques via access to multiple application programming interfaces (APIs) 270 to identify road conditions and restrictions, such as speed, road work/construction, traffic patterns, route guidance, etc. In different embodiments, the user can select one or more particular modes for the mobile app 220, whereby the mobile app 220 can (a) produce audio alerts, (b) produce visual (including AR) alerts, (c) present information about road conditions, (d) present information about local merchants and/or services, (e) present route guidance, (f) present driving suggestions, and/or (g) offer AR-based projections on billboards (see FIGS. 8-9D).

As shown in FIG. 2, the mobile app 220 includes an input processor 260 for receiving and processing the data shared from various sensors of user device 210. One or more APIs 270 (see FIG. 3) can receive the processed data from the input processor 260 to determine whether the device is in an environment, scenario, or other condition whereby the driver and/or vehicle are vulnerable or otherwise corresponds to a state that has been previously identified (e.g., by the user) as a state that should activate or trigger activation of an alert or other information. For example, an alert generator 290 can, in response to detection of a specific type of triggering event, cause the presentation of a visual message or AR-based indicator (i.e., in conjunction with an augmented reality module 280) via a display of or other visual output connected to the mobile device 210, and/or an audio message or other sound via a speaker of or other audio output connected to the mobile device 210.

Figure 3:
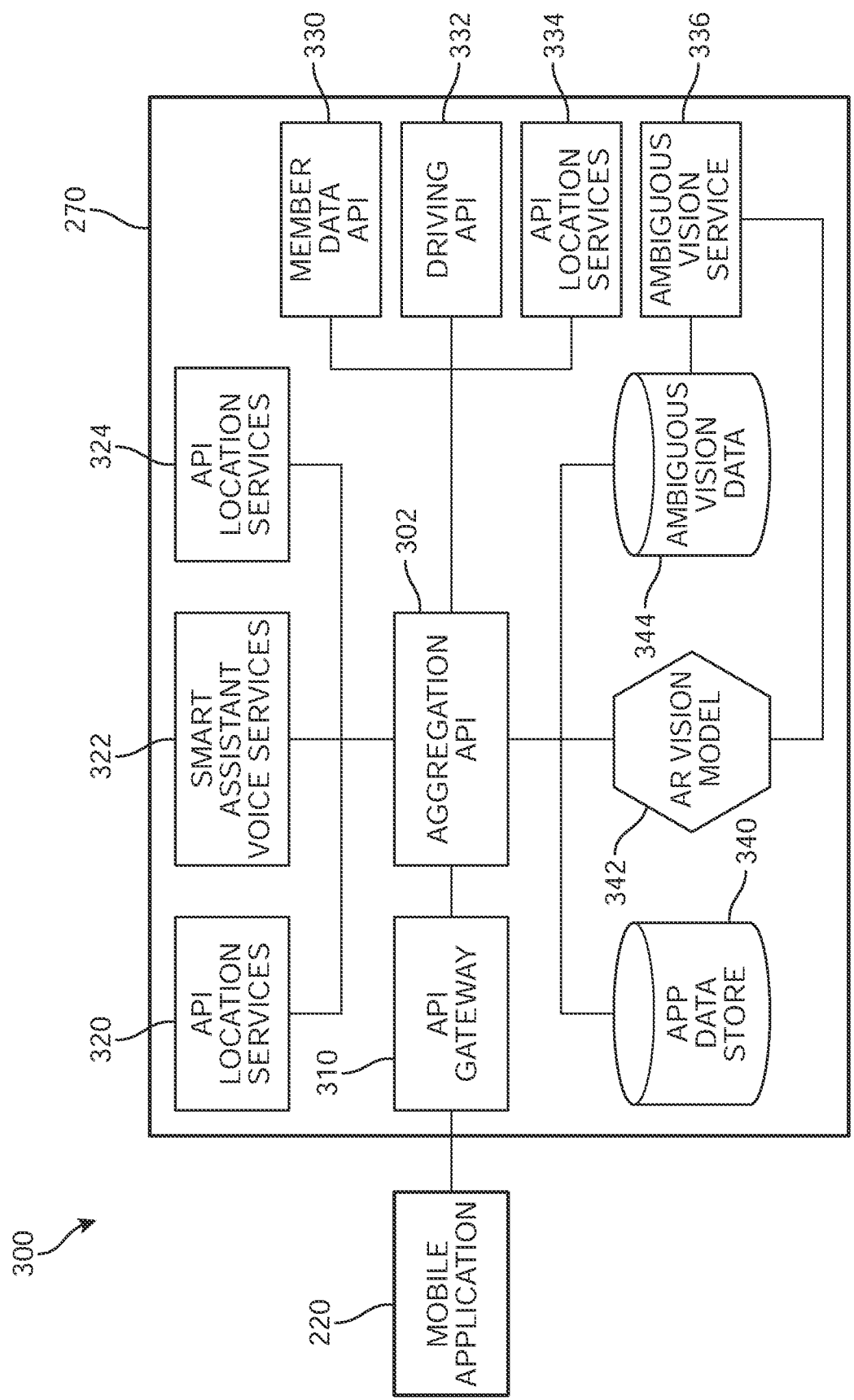
FIG. 3 is a schematic diagram of a mobile application architecture, according to an embodiment.

Furthermore, in some embodiments, even in cases in which no triggering event has occurred, the system 200 is configured to provide ongoing messaging and guidance. Referring to mobile app architecture 300 of FIG. 3, it can be understood that the mobile app 220 includes and/or has access to one or more API modules that are each configured to provide different features and functionality to the app. In the embodiment of FIG. 3, the mobile app 220 passes through an API gateway 310 (e.g., Layer 7®, Postman®, MuleSoft Anypoint®, ServiceNow®, Jitterbit®, Boomi®, etc.) to communicate with an aggregation API 302, which is configured to manage communications between the app interface and the various modules and APIs. This access can occur locally on the user device, or over a network to a remote server.

In different embodiments, the aggregation API 302 is configured to receive data from and transmit data to a plurality of APIs. In this case, these APIs include a location services API 320, a smart assistant/voice service API 322, a local merchants API 324, a member data API 330, a driving API 332, and an emergency API 334.

As a general matter, the smart assistant API 322 can refer to any number of voice services, including but not limited to Amazon® Voice Service, Echo®, Twilio®, Agora®, Nexmo®, Braze®, MessageBird®, Postscript®, Plivo®, etc. and is used to receive and process speech, including speech-to-text, by the user and provide natural language speech responses.

In one embodiment, the location services API 320 (e.g., Google® Places API, Factual's Global Places® API, Foursquare® API, Sygic Travel® API, Planet.osm™ API, Here Places™ API, etc.) is configured to retrieve information about businesses and other services near or around the user's current location as determined by the mobile app 220, thereby enabling presentation of options to the user that may be of relevance to them. For example, the user may request that the app present a notification if a specific restaurant or store is within a radius of X (any number) miles, or within an estimated X number of minutes driving distance from their current location. In another example, the app can be configured to present general categories (gas, food, shopping, hotels, etc.) per the user's preferences that are within the designated area. In some cases, the app can be used to notify the user generally to local points-of-interest.

In another embodiment, the local merchants API 324 can work in concert with the location services API 320 to determine whether there are any 'deals' or member discounts available at the merchants that are in the area. The results presented by this module can vary based on the member's account level or membership type (e.g., a "basic" member may have only limited discounts available at a merchant, while an "upgraded" member may have additional deals available at the same merchant). Thus, the notifications are dynamic and can take into account the user's preferences and status.

Furthermore, member data API 330 stores and manages general member (user) data, and maintains a record of the various services the user accesses. The driving API 332 is configured to track safe-driving violations and patterns, for example in order to provide appropriate feedback to the user/driver. The emergency API 334 can receive sensor data to determine whether there is a likelihood that the user is in danger or appears to require assistance. In one example, the emergency API 334 can automatically transmit a notification to a designated human (e.g., a family member or friend) and/or a service (e.g., ambulance, police, etc.) about the detected event. The aggregation API 302 also communicates with various data repositories and models, such as an app data store 340, an AR vision model 342, and an ambiguous vision database 344 which will share ambiguous image data with an ambiguous vision service 346 in order to improve classification of objects and the vision model 342. In other words, the mobile app 220 can be configured to transmit unclear or otherwise flagged situations back to a central processor for further analysis and training. Ongoing improvements to the vision neural network of the AR vision model 342 can be pushed back to the user's device as regular updates.

It should be understood that in other implementations, environment 200 in FIG. 2 (including mobile app architecture 300 of FIG. 3) can include additional or fewer modules or can include one or more additional computing devices or related server devices. The modules of environment 200 can be associated with the various local computing devices and, for example, can be disposed within the computing device. In alternative implementations, the modules of environment 200 can include independent computing devices that are coupled to, and in data communication with, the local computing devices. As used in this description, the term "module" is intended to include, but is not limited to, one or more computers, processing units, or devices configured to execute one or more software programs that include program code that causes a processing device(s) or unit(s) of the computer to execute one or more functions. Processing units can include one or more processors (e.g., microprocessors or central processing units (CPUs)), graphics processing units (GPUs), application specific integrated circuits (ASICs), or a combination of different processors.

In alternative embodiments, systems and modules can each include other computing resources/devices (e.g., cloud-based servers) that provide additional processing options for performing one or more of the machine learning determinations and calculations. The processing units or devices can further include one or more memory units or memory banks. In some implementations, the processing units execute programmed instructions stored in memory to cause system, devices, and modules to perform one or more functions described herein. The memory units/banks can include one or more non-transitory machine-readable storage mediums. The non-transitory machine-readable storage medium can include solid-state memory, magnetic disk, and optical disk, a random-access memory (RAM), a read-only memory (ROM), an erasable programmable read-only memory (e.g., EPROM, EEPROM, or Flash memory), or any other tangible medium capable of storing information.

Additional details regarding the computer vision model 342 are discussed with reference to FIG. 4. As image data 410 collected by a camera of the mobile device is received by the mobile app, it is passed through a feature parser layer 420 that is configured to break the image data into component parts. This allows for detection and classification various objects in the images by an object recognition algorithm, such as other cars 430, road signs 440, and road lanes 450. As each classification occurs, the data can be routed to the appropriate model for further processing. For example, cars 430 are passed through a car model 436 configured to determine a distance 432 of the car from the user's vehicle, as well as the car's predicted direction 434. In addition, road signs 440 are passed through a sign model 446 (see FIG. 6), and a shape 442 and color 444 for each sign is identified. The image data for the road lanes 450 is sent to a lane model 454 to determine a position 452 of the detected lanes. These three outputs of the three models are then conveyed to an advice layer 460, which is configured to determine what types of AR content, objects, and indicators should be selectively applied to the image data. In other words, the advice layer will determine what should overwrite (e.g., with an AR-type overlay) the image data to provide the virtual indicators and symbols that will be used to guide the user. These augmented image features may be added to the image data via image markup module 470 and a final output image 480 is generated for presentation to the user.

Figure 4:
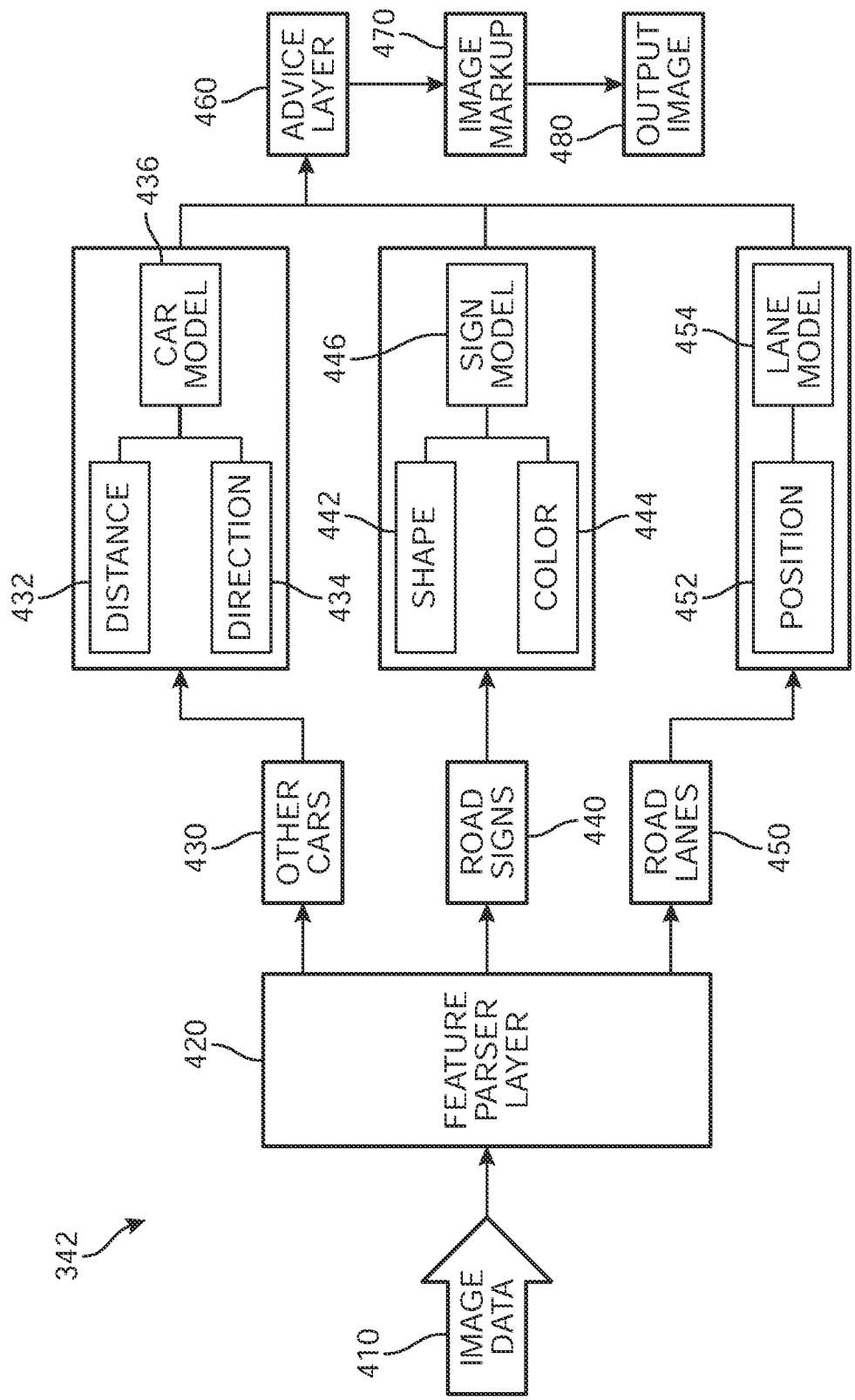
FIG. 4 is a flow diagram of a process of detecting and identifying various types of objects on a roadway, according to an embodiment.
Figure 5:
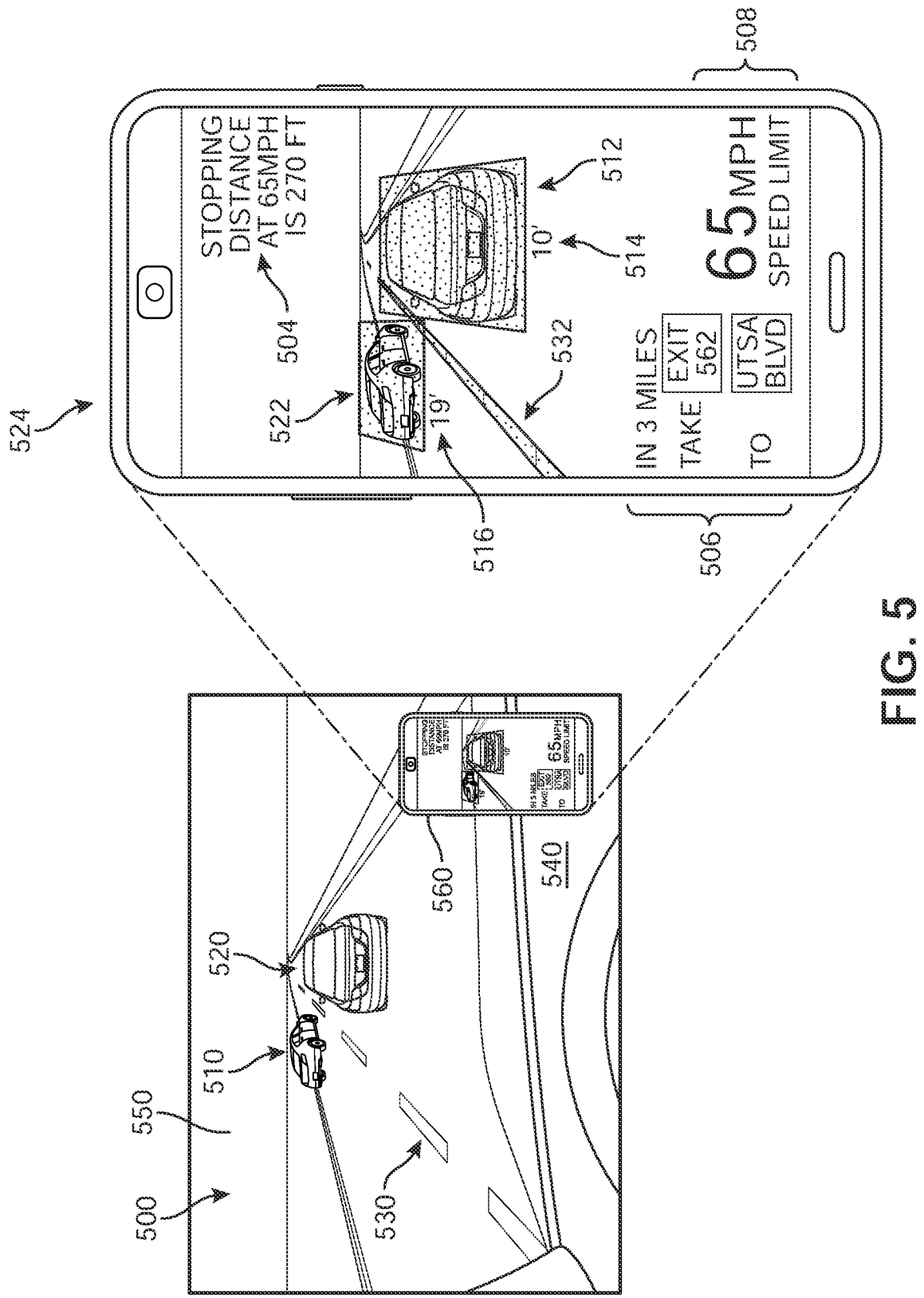
FIG. 5 is a schematic view of an interior of a vehicle in which a mobile computing device presents a plurality of AR-based object-related indicators, according to an embodiment.

An example of the process described in FIG. 4 is provided with reference to FIG. 5. In this scenario, the user has mounted a second device 560 on or around dashboard 540 in an interior compartment of their vehicle, such that a camera for second device 560 faces toward a forward windshield 550 through which roadway 500 can be observed. A first car 510 and a second car 520 are driving ahead of the user's vehicle at this time, each in a different lane demarcated by dashed lane markers 530. This view is captured by the lens of the camera, and the image data processed as described above. A magnified view 524 of the second device 560 is also shown to illustrate the output of a mobile app 510 running on the second device 560.

In this example, the roadway 500 is shown as a roadway image 502 that presents a scene that is a substantial duplicate to the one seen through the windshield 550 by the camera. However, the system has also superimposed or overlayed multiple AR-features to guide and/or alert the driver. In this case, the first car 510 has been overlaid by a first object marker 512 (shown here as a box to represent vehicles), as well as a first distance indicator 514 directly below the first object marker 512 ("10 feet"). Similarly, the second car 520 has been overlaid by a second object marker 522 and a second distance indicator 516 ("19 feet"). Furthermore, a lane divider 532 has been superimposed on the dashed lane markers 530 to cause the separation of the two lanes to 'pop' or otherwise be patently clear, regardless of any faded paint or eroded portions of road. In addition, as the driver continues forward, the system determines-based also on sensor data from second device 560 that is used to determine the speed of their vehicle-what a safe stopping distance ("stopping distance at 65 MPH is 270 feet") would be and presents a first message 504 on a non-road region of the display. Finally, in some embodiments, the navigation such as route guidance 506 and/or speed monitor 508 that tracks and displays the current route's speed limit may be presented, per the driver's preferences. In some embodiments, the speed monitor 508 can present an alert when the driver exceeds the current speed limit.

Additional detail regarding the models (car model 436, sign model 446, lane model 454) of FIG. 4 are discussed with reference to FIG. 6. As an example, the process performed by the sign model 440 is shown. However, in different embodiments, the approach may also be understood to be implemented by the lane model 454 and/or car model 436, whose outputs 670 are aggregated with the output of sign model 446. In a first stage 610, the image data classified as corresponding to road signs 440 is inputted into the sign model 446. As discussed in FIG. 4, the shape 442 and color 444 are obtained, and in addition, a type of sign 640 for the specific input is determined with reference to a sign library/database 650. In other words, based on the identified shape, color, text, etc. the model will find the closest match, such as regulatory signs (do not enter, wrong way, no left turn, etc.), warning signs (dip, deer crossing, road ends, bump, chevron sign, etc.), service signs (typically are blue and indicate nearby services including hospitals, call boxes, telephones, places to eat, and rest areas), and/or guide signs. Guide signs provide directional and mileage information to specific destinations. They can be rectangular or have other shapes. Guide signs also include route signs that mark federal interstates, state highways, and county or municipal roadways. The interstate system uses a shield symbol that is blue on the bottom and has a red band across the top. These specific details can be used to select the most likely sign type from the sign library 650.

Output 660 of the model can thereby include a general identification of the sign type, as well as other features associated with the sign such as sign color, distance to sign, orientation of sign, content of sign, and/or degree of legibility of sign. Together with outputs 670, the advice layer 460 refers to business rules 690 in order to determine whether some response by the system is warranted (can be based on user preferences) and what kind of response is to be presented. For example, the advice layer 460 can alert the driver that the speed limit has changed, overwrite a billboard with some other information or image (e.g., a proprietary advertisement), identify known cars by their bumper stickers, ensure that certain signs remain visible and unaffected by the system (e.g., hospital or police signs).

Figure 6:
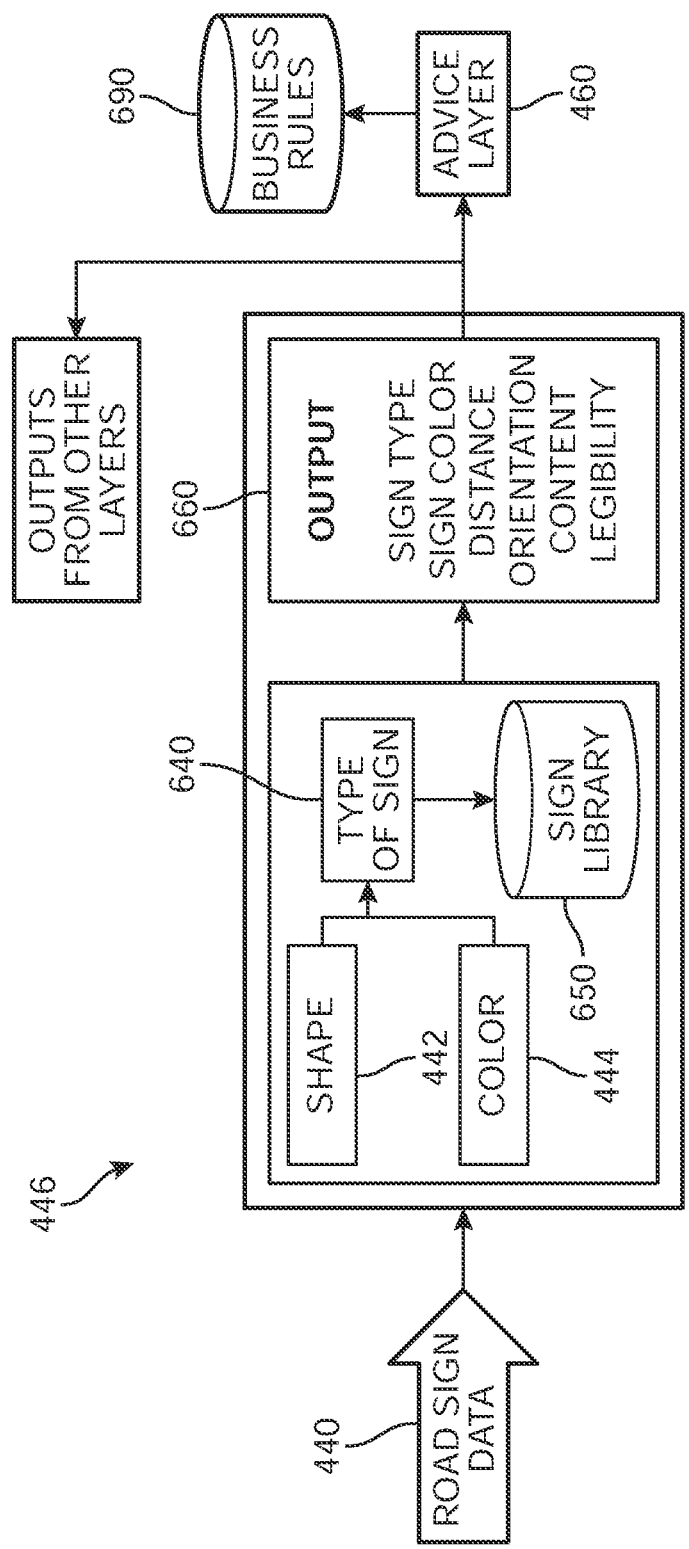
FIG. 6 is a flow diagram of a process of recognizing road sign data, according to an embodiment.
Figure 7:
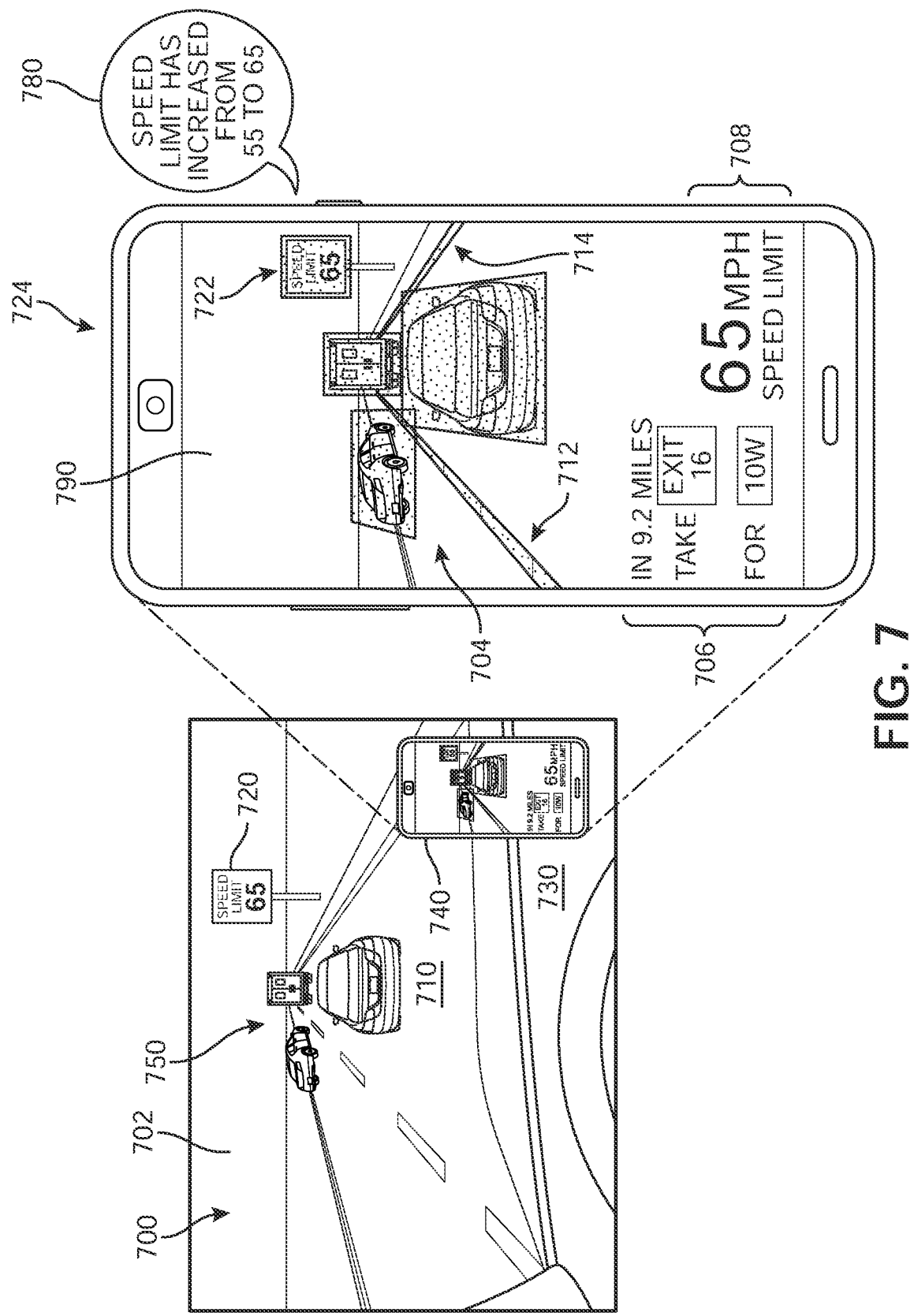
FIG. 7 is a schematic view of an interior of a vehicle in which a mobile computing device presents AR-based sign and lane indicators, according to an embodiment.

An example of the process described in FIG. 6 is provided with reference to FIG. 7. In this scenario, the user has mounted a third device 740 on or around dashboard 730 in an interior compartment of their vehicle, such that a camera for third device 740 faces toward a forward windshield 702 through which a lane 710 of roadway 700 can be observed. A plurality of cars 750 are visible in the adjacent lane, and a first sign 720 is located on the side of the road. This view is captured by the lens of the camera, and the image data processed as described above. A magnified view 724 of the third device 740 is also shown to illustrate the output of a mobile app 790 running on the third device 740.

In this example, the roadway 700 is shown as a roadway image 704 that presents a scene that is a substantial duplicate to the one seen through the windshield 702 by the camera. In addition, the system has superimposed or overlayed multiple AR-features to guide and/or alert the driver. In this case, the plurality of cars 750 have each been overlaid by an object marker as well as a distance indicator directly below the object marker, as described earlier with respect to FIG. 5. The lane 710 has also been outlined by two bounding lines 712 and 714 that more clearly and discernably establish the lane in which the driver is traveling, for example using various bright colors, such as neon or other colors that contrast more sharply against the road color, in contrast to the white-paint-on-gray-road markers typically used on the highway. Furthermore, the first sign 720 is now also highlighted with an outline 722 to alert the driver, while an audible alert 780 ("Speed limit has increased from 55 to 65") is produced by a speaker connected to the third device 740.

Figure 8A:
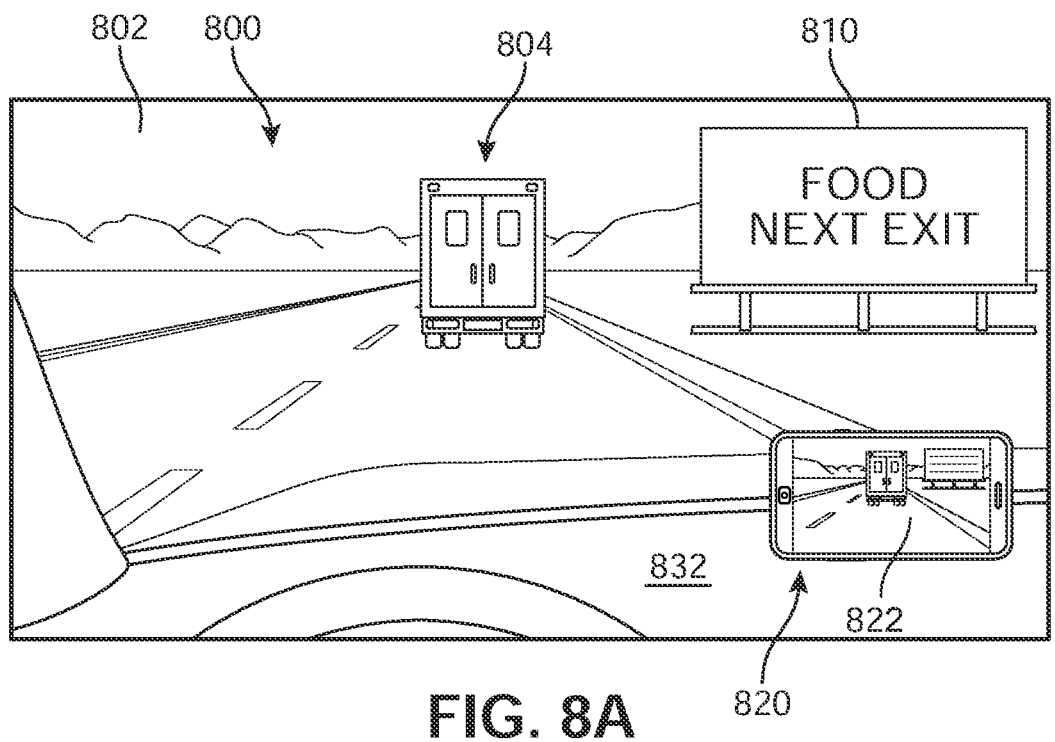
FIGS. 8A-8D are examples of AR-based projections that can be overlaid on a billboard, according to an embodiment.

For purposes of illustration, additional examples are now presented with respect to FIGS. 8A-9D. In the scenario of FIG. 8A, the user has mounted a fourth device 820 on or around dashboard 832 in an interior compartment of their vehicle, such that a camera for fourth device 820 faces toward a forward windshield 802 through which a roadway 800 can be observed. A truck 804 is visible moving ahead of the user's vehicle, and a billboard 810 is located on the side of the road. This view is captured by the lens of the camera, and the image data processed as described above for presentation on a display 822 of the fourth device 820. A sequence of views of the display of the fourth device 820 is presented in FIGS. 8B-8D that illustrate some examples of possible outputs of the mobile app running on the fourth device 820.

Figure 8B:
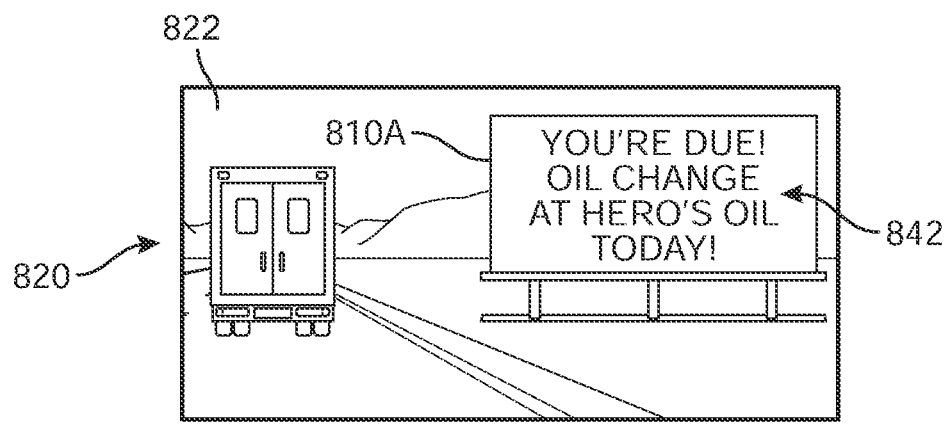

In FIG. 8B, the face of the billboard has been 'replaced' by or otherwise blocked behind a first projection or overlay 810a that is directed to the specific member based on information for the member and his/her vehicle. First content 842 for the first overlay 810a encourages the user to perform an oil change on their vehicle ("You're due! Oil change at Hero's Oil today"), which reminds the user that their vehicle is due for an oil change based on the user's account, and that a merchant Hero's Oil is available to perform the maintenance. In some embodiments, the user can select what types or categories of advertisement may be presented (if any).

Figure 8C:
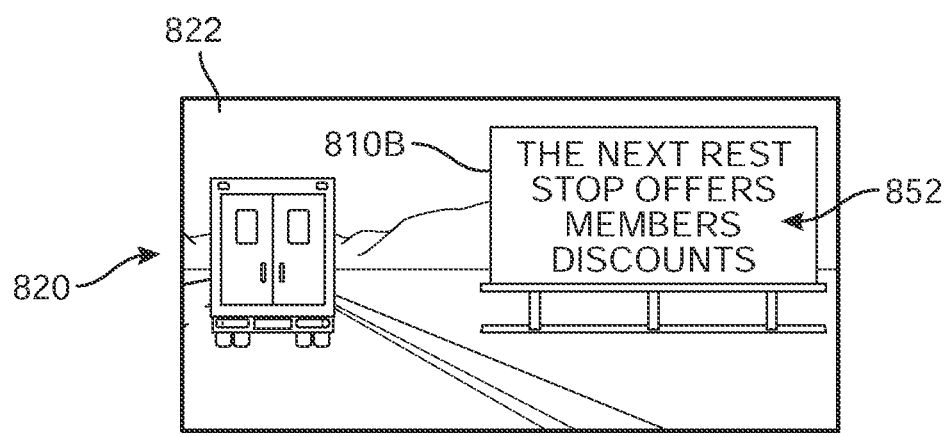

In FIG. 8C, the face of the billboard has been 'replaced' by or otherwise blocked behind a second overlay 810b that reminds the user that member-only discounts are available at merchants stationed at the upcoming rest stop. Thus, second content 852 of the second overlay 810b encourages the user to take advantage of their membership as well as informs them that there is a rest stop approaching ("The next rest stop offers member discounts!"). In some embodiments, the user can select what types or categories of offers or discounts should be shown (if any).

Figure 8D:
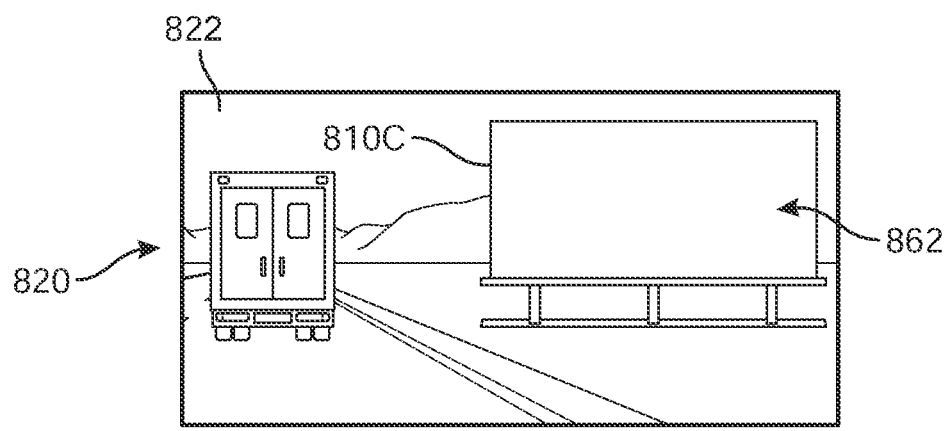

In FIG. 8D, the face of the billboard has been 'replaced' by or otherwise blocked behind a third overlay 810c that removes any distracting information from the billboard. Third content 862 for the third overlay 810c in this case is empty, and the billboard appears blank. In some embodiments, the user can select what types or categories of billboard content (e.g., explicit, food-related, political, or "sin stocks" such as gambling, tobacco, alcohol, defense, cannabis, and adult entertainment industries etc.) should be concealed or redacted (if any).

Figure 9A:
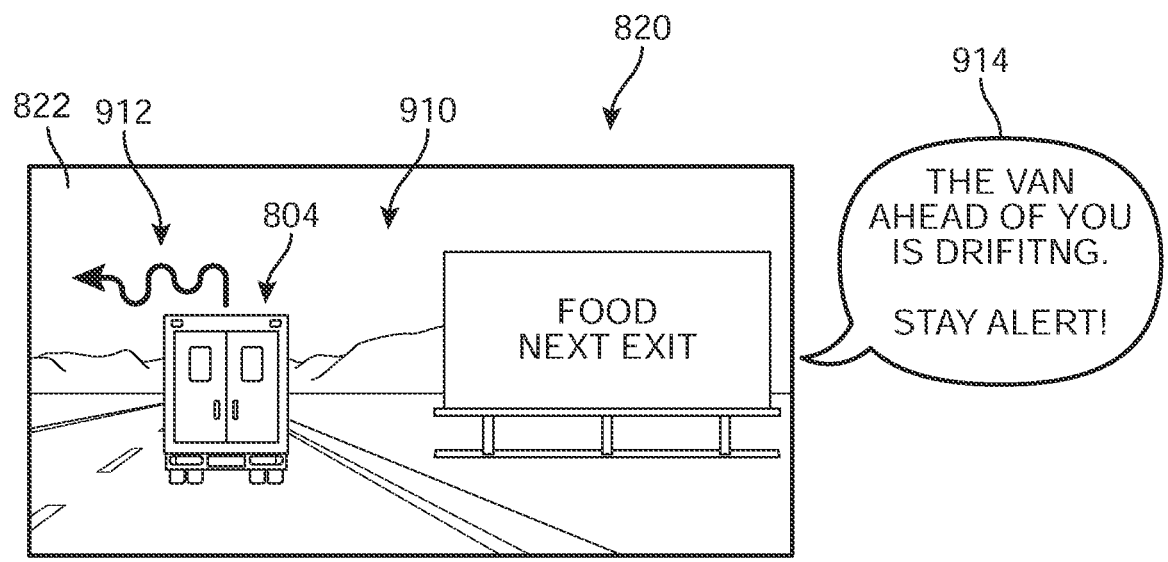
FIGS. 9A-9D are examples of AR-based projections that can be used to alert the driver of specific types of unsafe driving behaviors, according to an embodiment.

Moving to FIGS. 9A-9D, four examples illustrate some of the safety features that can be enabled for improving driver performance. In FIG. 9A, a first scenario 910 is depicted whereby the system determines, based on received image data for a period of time (e.g., a few seconds to a few minutes or more), that the movement of the truck 804 corresponds to an unsafe driving practice. In this case, the system classifies this movement as drifting, and presents a squiggly directional line as a first indicator 912 directly above the truck 804 that symbolizes drift, as well as the direction of the drift. In other embodiments, the squiggly line can be in the opposite direction, or both directions. In addition, in some embodiments, a first audio alert 914 can also or alternatively be presented ("The van ahead of you is drifting. Stay alert!"). In other embodiments, the content of the audio alert can vary, or can provide additional details (e.g., the truck has been observed as drifting repeatedly over the last X minutes, the truck has also engaged in other erratic movements, etc.).

Figure 9B:
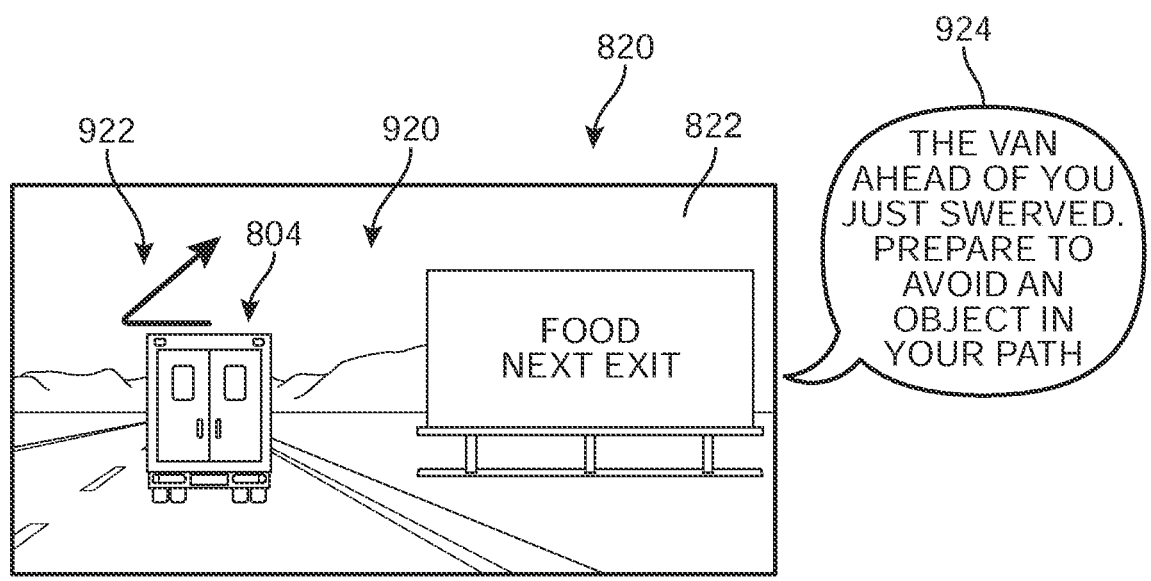

In FIG. 9B, a second scenario 920 is depicted whereby the system determines, based on received image data for a period of time (e.g., a few seconds to a few minutes or more), that the movement of the truck 804 corresponds to an unsafe driving practice. In this case, the system classifies this movement as swerving, and presents a sharp turning arrow as a second indicator 922 directly above the truck 804 that symbolizes a swerve, as well as the direction of the swerve. In other embodiments, the sharp turn line can be in the opposite direction, or both directions. In addition, in some embodiments, a second audio alert 924 can also or alternatively be presented ("The van ahead of you just swerved. Prepare to avoid an object in your path"). Such an audio content is extrapolated from the swerve, which frequently indicates that a car is attempting to avoid a sudden obstacle in its path.

Figure 9C:
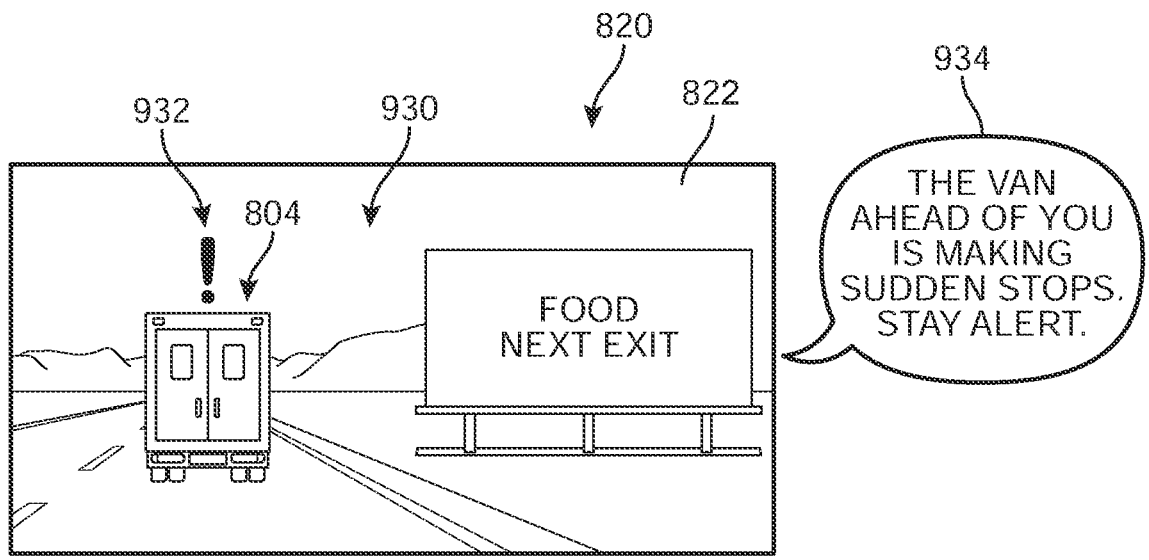

In FIG. 9C, a third scenario 930 is depicted whereby the system determines, based on received image data for a period of time (e.g., a few seconds to a few minutes or more), that the movement of the truck 804 corresponds to an unsafe driving practice. In this case, the system classifies this movement as unpredictable, whereby sudden stopping, rapid speeding and slowing down, and/or tailgating are occurring, and presents an exclamation mark as a third indicator 932 directly above the truck 804 that symbolizes danger. In addition, in some embodiments, a third audio alert 934 can also or alternatively be presented ("The van ahead of you is making sudden stops. Stay alert"). Such an audio content is extrapolated from the swerve, which frequently indicates that a car is attempting to avoid a sudden obstacle in its path.

Figure 9D:
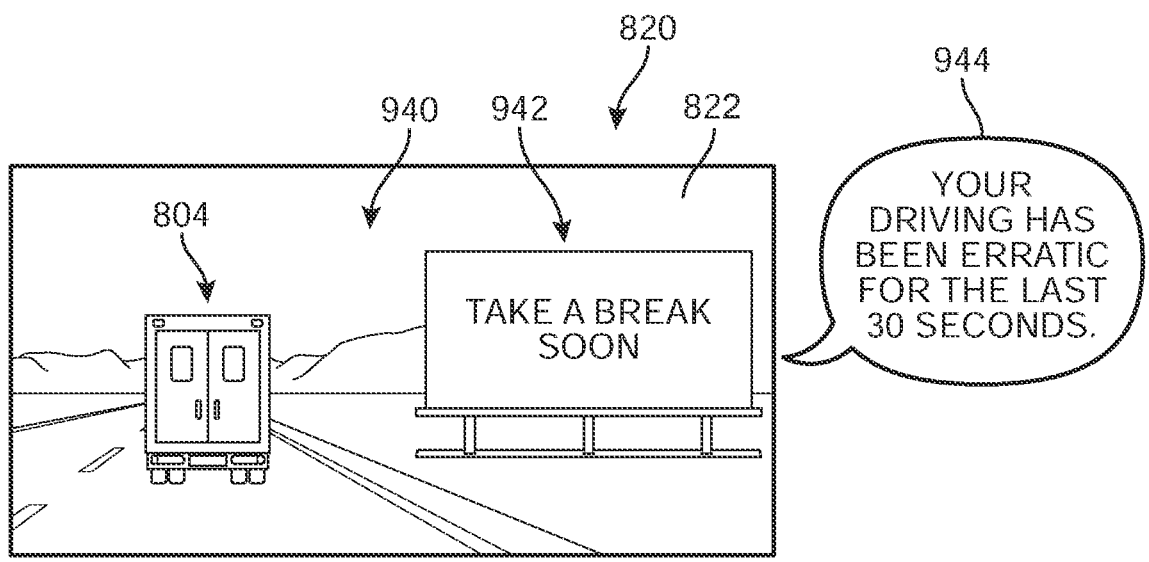

In FIG. 9D, a fourth scenario 940 is depicted whereby the system determines, based on received image and/or other sensor data for a period of time (e.g., a few seconds to a few minutes or more), that the movement of the vehicle in which the fourth device is disposed is engaged in an unsafe driving practice. In this case, the system classifies the vehicle's movement as erratic (including any of the dangerous driving actions discussed herein), and presents an overlay on the billboard as a fourth indicator 932 ("Take a break soon") that reminds the driver that rest stops are important, particularly following their recent driving behavior. In addition, in some embodiments, a fourth audio alert 944 can also or alternatively be presented ("Your driving has been erratic for the last 30 seconds"). Such an audio content can be based on the type of data obtained, and either the billboard overlay and/or the audio content can include additional information identifying the detected unsafe driving practices detected by the system. It should be understood that the shapes (e.g., arrows, exclamation mark, etc.) presented can vary widely while still responding to the same triggering event. These shapes can be pre-designated by the system or selected by the user.

Figure 10:
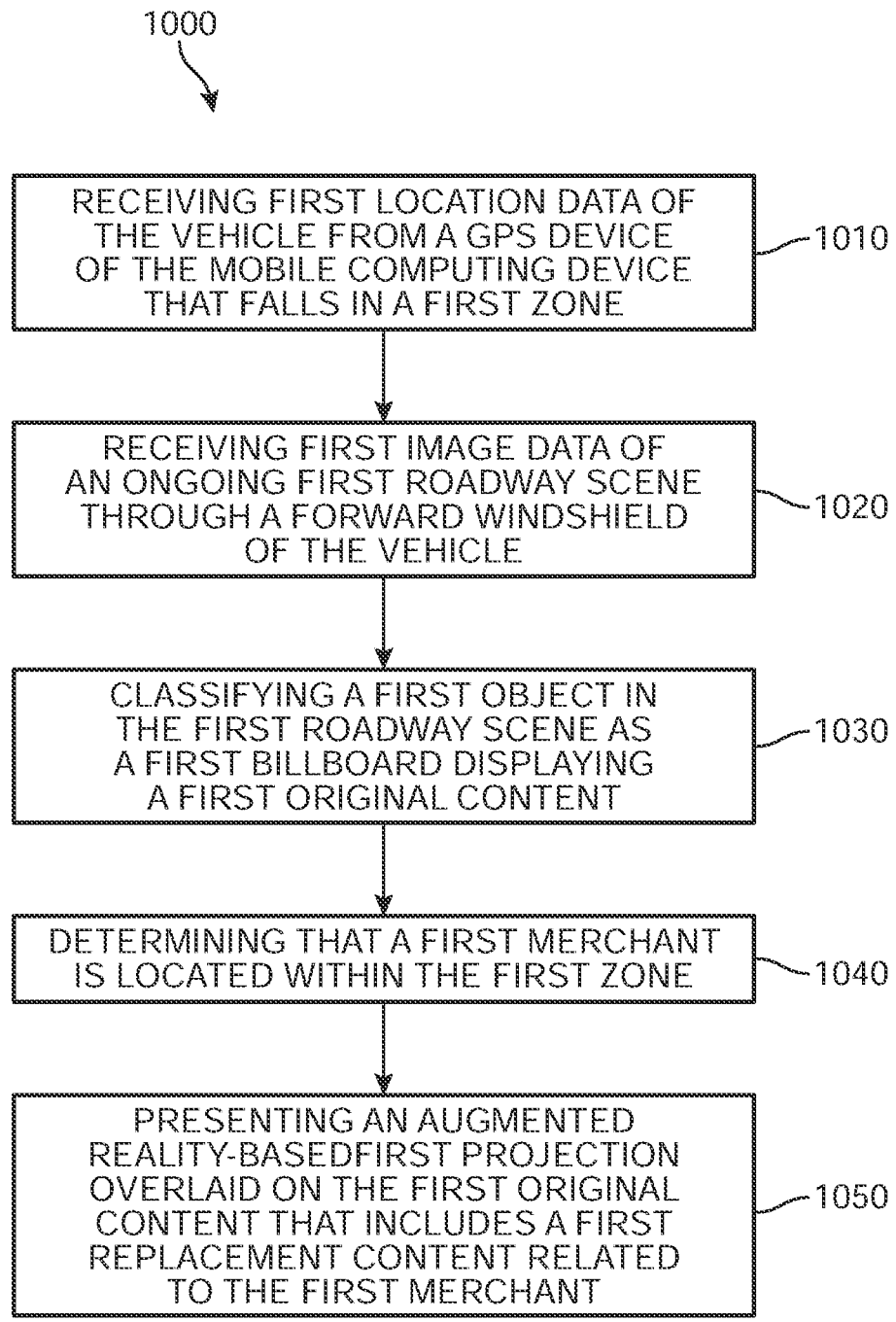
FIG. 10 is a flow chart depicting a process of intelligently managing the presentation of information to a driver of a vehicle, according to an embodiment.

FIG. 10 is a flow chart illustrating an embodiment of a computer-implemented method 1000 of intelligently managing the presentation of information to a driver of a vehicle. In a first step 1010, the method 1000 includes receiving, at an application of a mobile computing device, first location data of the vehicle from a GPS device of the mobile computing device as corresponding to/falling in a first (geographic) zone (i.e., the vehicle has a current position that is within the range of the first zone), and a second step 1020 of receiving, at the application, first image data of an ongoing first roadway scene through a forward windshield of the vehicle, the first image data captured by a camera associated with the mobile computing device. In a third step 1030, the method 1000 includes classifying, at the application, a first object in the first roadway scene as a first billboard displaying a first original content, and a fourth step 1040 includes determining, via the application and with reference to a merchant database, that a first merchant is located within the first zone. A fifth step 1050 includes presenting, via the application and on a display of the mobile computing device, in response to determining the first merchant is in the first zone, an augmented reality-based first projection overlaid on the first original content, the first projection comprising a first replacement content that is related to the first merchant.

The first zone can be understood to represent a distance or driving time range around the vehicle, such that merchants or other services or destinations that are either at a maximum 'X' distance or a maximum 'X' minutes driving time away would fall in the first zone, while merchants or other services or destinations that are either greater than an 'X' distance but less than a 'Y' distance away or greater than an 'X' minutes driving time away but less than a 'Y' minutes driving time away would fall in second (different) zone.

In other embodiments, the method may include additional steps or aspects. In some embodiments, the method further includes one or more steps such as determining, via the application and with reference to a member database for a first organization in which the driver is a member, that the first merchant offers a discount to members of the first organization, where the first replacement content further includes an indication that the first merchant offers the discount to the members. In another example, the method can also include a step of identifying, via the application and with reference to the merchant database and the first location data, directions to the first merchant from a current position of the vehicle, where the first replacement content further includes a first step of the directions.

In some embodiments, the method also includes a step of determining, with reference to a vehicle status stored in an account for the driver in the member database, that the vehicle is due for a first service, where the first merchant is selected from a plurality of merchants in the first zone based on the ability of the first merchant to perform the first service. In such cases, the first replacement content can further include a reminder that the vehicle is due for the first service. In another example, the first replacement content can further include an indication that the first merchant is able to perform the first service.

In other embodiments, the method can include steps of receiving, at the application, second image data of an ongoing second roadway scene through a forward windshield of the vehicle, classifying, at the application, a second object in the second roadway scene as a second billboard displaying a second original content, determining, via the application and with reference to pre-selected preferences for the driver, that the second original content includes information about a first type of merchant undesired by the driver, and presenting, via the application and on a display of the mobile computing device, an augmented reality-based second projection overlaid on the second original content, and the second projection effectively redacts the second original content. In such cases, the first type of merchant can be associated with one or more of gambling, tobacco, alcohol, defense, *cannabis*, and adult entertainment industries.

Other methods can also be contemplated within the scope of this disclosure. For example, a computer-implemented method of intelligently presenting driving guidance to a driver of a first vehicle may be provided. The method includes a first step of receiving, at an application of a mobile computing device, first image data of an ongoing first roadway scene through a forward windshield of the first vehicle, the first image data captured by a camera associated with the mobile computing device, a second step of classifying, at the application, a first object in the first roadway scene as one of a vehicle and lane markers, a third step of determining, at the application and based at least on a detected movement of the first object, that an unsafe driving behavior has occurred, and a fourth step of presenting, in response to determining an unsafe driving behavior has occurred, a first message alerting the driver of the unsafe driving behavior.

In other embodiments, the method may include additional steps or aspects. In one embodiment, the first message is presented as audio content from a speaker for the mobile computing device. In another embodiments, the first message is presented as visual content on a display for the mobile computing device. In some examples, the first object is a second vehicle, and unsafe driving behavior is determined as being exhibited by the second vehicle, and the method further includes presenting, via the application and on a display of the mobile computing device, an augmented reality-based first indicator directly adjacent to the second vehicle. In some other embodiments, the method also includes classifying the unsafe driving behavior as one of a swerving, drifting, or erratic driving behavior, where the first indicator differs based on the classification of the unsafe driving behavior The embodiments make use of one or more motor vehicles. As used herein, the term "motor vehicle," or simply vehicle, refers to any kind of car, van, truck, motorcycle, or similar motorized vehicle. A motor vehicle can be powered using an internal combustion engine, an electric motor, a hybrid of an internal combustion engine and an electric motor, as well as any other suitable power source. A motor vehicle may further include wheels that are powered by the engine or motor and components for controlling the vehicle (for example, pedals and a steering wheel).

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

The computing devices and systems described herein may include one or more processors, a memory, one or more storage devices, and one or more input/output (I/O) devices controllable via one or more I/O interfaces. The various components may be interconnected via at least one system bus, which may enable the transfer of data between the various modules and components of the system.

The processor(s) may be configured to process instructions for execution within the system. The processor(s) may include single-threaded processor(s), multi-threaded processor(s), or both. The processor(s) may be configured to process instructions stored in the memory or on the storage device(s). The processor(s) may include hardware-based processor(s) each including one or more cores. The processor(s) may include general purpose processor(s), special purpose processor(s), or both. The memory may store information within the system. In some implementations, the memory includes one or more computer-readable media. The memory may include any number of volatile memory units, any number of non-volatile memory units, or both volatile and non-volatile memory units. The memory may include read-only memory, random access memory, or both.

In some examples, the memory may be employed as active or physical memory by one or more executing software modules.

The storage device(s) may be configured to provide (e.g., persistent) mass storage for the system. In some implementations, the storage device(s) may include one or more computer-readable media. For example, the storage device(s) may include a floppy disk device, a hard disk device, an optical disk device, or a tape device. The storage device(s) may include read-only memory, random access memory, or both. The storage device(s) may include one or more of an internal hard drive, an external hard drive, or a removable drive.

One or both of the memory or the storage device(s) may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system. In some implementations, the CRSM may include a data store that provides storage of computer-readable instructions or other information in a non-transitory format. The CRSM may be incorporated into the system or may be external with respect to the system. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) and the memory may be supplemented by, or incorporated into, one or more application-specific integrated circuits (ASICs).

The system may include one or more I/O devices. The I/O device(s) may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) may also include one or more output devices such as a display, LED(s), an audio output device (e.g., a speaker), a printer, a haptic output device, and so forth. The I/O device(s) may be physically incorporated in one or more computing devices of the system, or may be external with respect to one or more computing devices of the system.

The system may include one or more I/O interfaces to enable components or modules of the system to control, interface with, or otherwise communicate with the I/O device(s). The I/O interface(s) may enable information to be transferred in or out of the system, or between components of the system, through serial communication, parallel communication, or other types of communication. For example, the I/O interface(s) may comply with a version of the RS-232 standard for serial ports, or with a version of the IEEE 1284 standard for parallel ports. As another example, the I/O interface(s) may be configured to provide a connection over Universal Serial Bus (USB) or Ethernet. In some examples, the I/O interface(s) may be configured to provide a serial connection that is compliant with a version of the IEEE 1394 standard. The I/O interface(s) may also include one or more network interfaces that enable communications between computing devices in the system, or between the system and other network-connected computing systems. The network interface(s) may include one or more network interface controllers (NICs) or other types of transceiver devices configured to send and receive communications over one or more networks, such as the network(s), using any network protocol.

Computing devices of the system may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet. The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer-implemented method of intelligently managing the presentation of information to a driver of a vehicle, the method comprising:
receiving, at an application running on a mobile phone of the driver, first location data of the vehicle from a GPS device of the mobile phone that falls in a first zone;

receiving, at the application, first image data of an ongoing first roadway scene through a forward windshield of the vehicle, the first image data captured by a camera associated with the mobile phone, wherein the mobile phone is mounted within an interior region of the vehicle such that the ongoing first roadway scene through the forward windshield of the vehicle is within a field of view of the camera;

passing the first image data captured by the camera of the mobile phone through a feature parser layer of the application to detect and classify objects in the first image data using an object recognition algorithm;

classifying, at the application, a first object in the first roadway scene as a first billboard displaying a first original content, wherein the first object is identified as the first billboard by the object recognition algorithm using a sign model;

determining, via the application and with reference to a merchant database, that a first merchant is located within the first zone, wherein the first zone represents a maximum first distance from the vehicle or a maximum first driving time from the vehicle;

determining, by an advice layer of the application, a first replacement content to be applied to the first image data, wherein the first replacement content is related to the first merchant;

adding the first replacement content to the first image data using an image markup module of the mobile phone to generate an augmented reality-based first projection; and presenting, via the application and on a display of the mobile phone, in response to determining the first merchant is in the first zone, the augmented reality-based first projection overlaid on the first original content, the first projection including the first replacement content that is related to the first merchant.

2. The method of claim 1, further comprising:
determining, via the application and with reference to a member database for a first organization in which the driver is a member, that the first merchant offers a discount to members of the first organization,
wherein the first replacement content further includes an indication that the first merchant offers the discount to the members.

3. The method of claim 1, further comprising:
identifying, via the application and with reference to the merchant database and the first location data, directions to the first merchant from a current position of the vehicle,
wherein the first replacement content further includes a first step of the directions.

4. The method of claim 1, further comprising:
determining, with reference to a vehicle status stored in an account for the driver in the member database, that the vehicle is due for a first service,
wherein the first merchant is selected from a plurality of merchants in the first zone based on the ability of the first merchant to perform the first service.

5. The method of claim 4, wherein the first replacement content further includes a reminder that the vehicle is due for the first service.

6. The method of claim 4, wherein the first replacement content further includes an indication that the first merchant is able to perform the first service.

7. The method of claim 1, further comprising:
receiving, at the application, second image data of an ongoing second roadway scene through the forward windshield of the vehicle;
classifying, at the application, a second object in the second roadway scene as a second billboard displaying a second original content;
determining, via the application and with reference to pre-selected preferences for the driver, that the second original content includes information about a first type of merchant undesired by the driver; and
presenting, via the application and on a display of the mobile phone, an augmented reality-based second projection overlaid on the second original content, wherein the second projection effectively redacts the second original content.

8. The method of claim 7, wherein the first type of merchant is associated with one or more of gambling, tobacco, alcohol, defense, *cannabis*, and adult entertainment industries.

9. The method of claim 1, further comprising:
determining, via the application and with reference to the merchant database, that at least one second merchant is located within a second zone, wherein the second zone is greater than the maximum first distance from the vehicle or the maximum first driving time from the vehicle, but less than a maximum second distance from the vehicle or a maximum second driving time from the vehicle.

10. The method of claim 1, wherein the first image data includes at least a shape and a color of the first object; and
wherein the sign model uses the shape and the color to determine the first object is the first billboard by matching the shape and the color to a type of sign included in a sign library database.

11. A system for intelligently managing the presentation of information to a driver of a vehicle, the system comprising a processor and machine-readable media including instructions which, when executed by the processor, cause the processor to:
receive, at an application running on a mobile phone of the driver, first location data of the vehicle from a GPS device of the mobile computing device that falls in a first zone;
receive, at the application, first image data of an ongoing first roadway scene through a forward windshield of the vehicle, the first image data captured by a camera associated with the mobile phone, wherein the mobile phone is mounted within an interior region of the vehicle such that the ongoing first roadway scene through the forward windshield of the vehicle is within a field of view of the camera;
pass the first image data captured by the camera of the mobile phone through a feature parser layer of the application to detect and classify objects in the first image data using an object recognition algorithm;
classify, at the application, a first object in the first roadway scene as a first billboard displaying a first original content, wherein the first object is identified as the first billboard by the object recognition algorithm using a sign model;
determine, via the application and with reference to a merchant database, that a first merchant is located within the first zone, wherein the first zone represents a maximum first distance from the vehicle or a maximum first driving time from the vehicle;

determine, by an advice layer of the application, a first replacement content to be applied to the first image data, wherein the first replacement content is related to the first merchant;

add the first replacement content to the first image data using an image markup module of the mobile phone to generate an augmented reality-based first projection; and present, via the application and on a display of the mobile phone, in response to determining the first merchant is in the first zone, the augmented reality-based first projection overlaid on the first original content, the first projection including the first replacement content that is related to the first merchant.

12. The system of claim 11, wherein the instructions further cause the processor to determine, via the application and with reference to a member database for a first organization in which the driver is a member, that the first merchant offers a discount to members of the first organization, wherein the first replacement content further includes an indication that the first merchant offers the discount to the members.

13. The system of claim 11, wherein the instructions further cause the processor to identify, via the application and with reference to the merchant database and the first location data, directions to the first merchant from a current position of the vehicle, wherein the first replacement content further includes a first step of the directions.

14. The system of claim 11, wherein the instructions further cause the processor to determine, with reference to a vehicle status stored in an account for the driver in the member database, that the vehicle is due for a first service, wherein the first merchant is selected from a plurality of merchants in the first zone based on the ability of the first merchant to perform the first service.

15. The system of claim 14, wherein the first replacement content further includes a reminder that the vehicle is due for the first service.

16. The system of claim 14, wherein the first replacement content further includes an indication that the first merchant is able to perform the first service.

17. The system of claim 11, wherein the instructions further cause the processor to:

receive, at the application, second image data of an ongoing second roadway scene through the forward windshield of the vehicle;

classify, at the application, a second object in the second roadway scene as a second billboard displaying a second original content;

determine, via the application and with reference to pre-selected preferences for the driver, that the second original content includes information about a first type of merchant undesired by the driver; and present, via the application and on a display of the mobile phone, an augmented reality-based second projection overlaid on the second original content, wherein the second projection effectively redacts the second original content.

18. The system of claim 11, wherein the instructions further cause the processor to:

determine, via the application and with reference to the merchant database, that at least one second merchant is located within a second zone, wherein the second zone is greater than the maximum first distance from the vehicle or the maximum first driving time from the vehicle, but less than a maximum second distance from the vehicle or a maximum second driving time from the vehicle.

19. The system of claim 11, wherein the first image data includes at least a shape and a color of the first object; and wherein the sign model uses the shape and the color to determine the first object is the first billboard by matching the shape and the color to a type of sign included in a sign library database.

* * * * *